(12) United States Patent
Horii et al.

(10) Patent No.: US 11,674,936 B2
(45) Date of Patent: Jun. 13, 2023

(54) THERMAL HISTORY DETECTION LABEL AND REAGENT KIT

(71) Applicant: SYSMEX CORPORATION, Kobe (JP)

(72) Inventors: Kazuyoshi Horii, Kobe (JP); Shoichi Banno, Toyota (JP); Ken Odashiro, Atsugi (JP)

(73) Assignee: SYSMEX CORPORATION, Kobe (JP)

( * ) Notice: Subject to any disclaimer, the term of this patent is extended or adjusted under 35 U.S.C. 154(b) by 270 days.

(21) Appl. No.: 17/036,002

(22) Filed: Sep. 29, 2020

(65) Prior Publication Data
US 2021/0096114 A1 Apr. 1, 2021

(30) Foreign Application Priority Data
Sep. 30, 2019 (JP) .............................. JP2019-179948

(51) Int. Cl.
  *G01N 31/22* (2006.01)
  *G01N 21/78* (2006.01)
  *G01N 21/77* (2006.01)

(52) U.S. Cl.
  CPC ........... *G01N 31/229* (2013.01); *G01N 21/78* (2013.01); *G01N 2021/7796* (2013.01)

(58) Field of Classification Search
  CPC ................ G01N 31/229; G01N 21/78; G01N 2021/7796; G01K 3/04; G01K 11/06
  See application file for complete search history.

(56) References Cited

U.S. PATENT DOCUMENTS

| 3,695,903 | A | | 10/1972 | Telkes et al. |
| 4,601,588 | A | * | 7/1986 | Takahara ............... G01K 11/06 374/E11.006 |
| 4,753,188 | A | | 6/1988 | Schmoegner |

(Continued)

FOREIGN PATENT DOCUMENTS

| JP | 2003-279422 A | 10/2003 |
| JP | 2006-317384 A | 11/2006 |

(Continued)

OTHER PUBLICATIONS

Extended European Search Report dated Feb. 23, 2021, by the European Patent Office in corresponding European Patent Application No. 20199256.7. (7 pages).

(Continued)

*Primary Examiner* — Jennifer Wecker
*Assistant Examiner* — Alea N. Martin
(74) *Attorney, Agent, or Firm* — Buchanan Ingersoll & Rooney PC

(57) ABSTRACT

A thermal history detection label for detecting a thermal history over a temperature range to be monitored while suppressing an increase in label size is provided. The thermal history detection label is configured to detect a thermal history by the permeation of a molten permeating material into a permeation body, and the thermal history detection label includes a permeating material that integrally includes a first permeating material having a first melting point and a second permeating material having a second melting point higher than the first melting point, and a permeation body into which the permeating material permeates.

20 Claims, 11 Drawing Sheets

(56) References Cited

U.S. PATENT DOCUMENTS

| | | | | |
|---|---|---|---|---|
| 5,053,339 A | * | 10/1991 | Patel | G01K 3/04 |
| | | | | 116/206 |
| 2008/0056329 A1 | | 3/2008 | Smith et al. | |
| 2009/0050049 A1 | * | 2/2009 | Craig | G01K 1/02 |
| | | | | 374/E11.006 |
| 2012/0027045 A1 | * | 2/2012 | McLellan | G01K 3/04 |
| | | | | 374/161 |
| 2019/0113396 A1 | | 4/2019 | Fuhr et al. | |

FOREIGN PATENT DOCUMENTS

| | | |
|---|---|---|
| JP | 2007-121017 A | 5/2007 |
| JP | 2016-061563 A | 4/2016 |
| JP | 2019-023565 A | 2/2019 |
| JP | 2019-100831 A | 6/2019 |

OTHER PUBLICATIONS

Communication pursuant to Article 94(3) EPC dated Mar. 24, 2023, by the European Patent Office in counterpart European Patent Application No. 20199256.7.

Office Action dated Apr. 25, 2023, by Japanese Patent Office in counterpart Japanese Patent Application No. 2019-179948 with an English translation (12 pages).

* cited by examiner

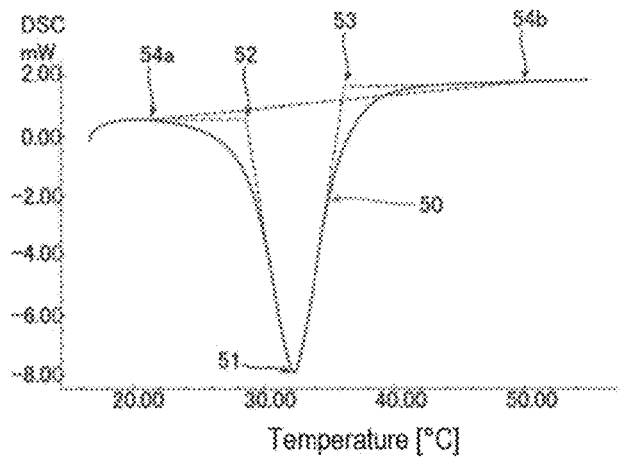
FIG. 4
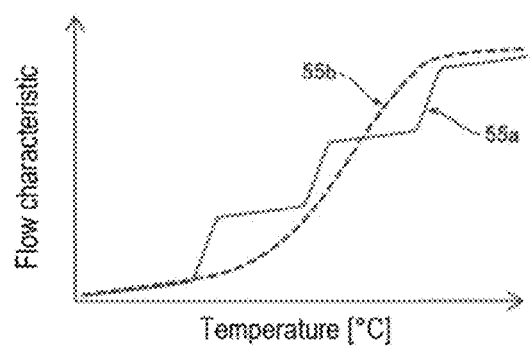
FIG. 5
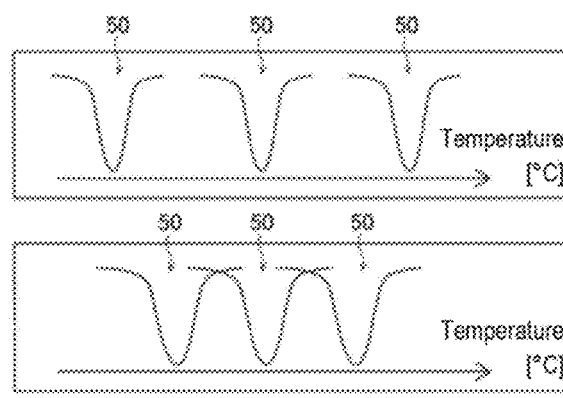
FIG. 6A
FIG. 6B

Reference example

Example 3

THERMAL HISTORY DETECTION LABEL AND REAGENT KIT

REFERENCE TO RELATED APPLICATIONS

This application claims priority from prior Japanese Patent Application No. 2019-179948, filed on Sep. 30, 2019, entitled "THERMAL HISTORY DETECTION LABEL AND REAGENT KIT", the entire contents of which are incorporated herein by reference.

FIELD OF THE INVENTION

The present invention relates to a thermal history detection label for detecting a thermal history over time and a reagent kit including the thermal history detection label.

BACKGROUND

Japanese Unexamined Patent Application Publication No. 2007-121017, as shown in FIG. 26, discloses a time-dependent change type temperature indicating label 900 including a base film 901, a temperature-sensitive material 902 installed on the surface of the base film 901, and a strip-shaped absorption coloring material 903 installed on the base film 901 so that an end portion overlaps with the temperature sensitive material 902. When the temperature reaches or exceeds a preset temperature, the temperature sensitive material 902 melts and soaks into the absorbing and coloring material 903 to make the opaque portion located on the surface side of the absorption coloring material 903 transparent. As a result, the absorption coloring material 903 appears to be transparent in the colored portion on the back surface side in the transparent portion. The melted temperature sensitive material 902 increases the permeated area over time. The accumulation time above the set temperature can be grasped from the size of the colored portion.

In the above-mentioned Japanese Unexamined Patent Application Publication No. 2007-121017, a plurality of temperature sensitive materials 902a to 902j that start melting at different arbitrary set temperatures are installed in parallel on the base film 901, and each of the temperature sensitive materials absorbs and develops colorants 903a to 903j. In this way it is possible to grasp the accumulation time when a plurality of temperatures exceed the set temperature across the temperature range to be monitored.

SUMMARY OF THE INVENTION

The temperature indicating label of Japanese Unexamined Patent Application Publication No. 2007-121017 is used for managing the thermal history of the object by being attached to the object whose thermal history is to be monitored. In the management of the thermal history, whether the accumulation time set separately for each temperature is exceeded over the temperature range to be monitored is often managed. For example, different thermal history patterns can be set for each set temperature, such that accumulation is allowed for X hours at A[° C.], Y hours at B[° C.], and Z hours at C[° C.].

However, in the temperature indicating label of Japanese Unexamined Patent Application Publication No. 2007-121017 described above, in order to detect a plurality of thermal history patterns over a temperature range to be monitored, a plurality of temperature sensitive materials having different set temperatures and a plurality of absorption coloring materials are required to be arranged on the base film. As a result, the size of the temperature indicating label becomes large, so that the attachment space on the object becomes large. Therefore, it is desirable to detect the thermal history over the temperature range to be monitored while suppressing an increase in the label size.

The present invention is directed to detecting thermal history over a temperature range to be monitored while suppressing an increase in label size.

As shown in FIGS. 1A and 1B, the thermal history detection label (100) of the present invention is configured to detect a thermal history by permeation of a molten permeating material (10) into a permeation body (20), and the thermal history detection label 100 includes permeating material (10) integrally including a first permeating material (11) having a first melting point and a second permeating material (12) having a second melting point higher than the first melting point, and a permeation body (20) through which the permeating material (10) permeates.

Note that, in this specification, "integrally including a first permeating material and a second permeating material" means that the first permeating material and the second permeating material are combined to form one permeating material, and the conceptual meaning includes that the first permeating material and the second permeating material are mixedly integrated, and that the first permeating material and the second permeating material are laminatedly and integrated.

In the thermal history detection label (100) of the present invention described above, the permeating material (10) integrally includes the first permeating material (11) and the second permeating material (12), and the flow characteristics of the permeating material (10) at a plurality of set temperatures can be adjusted. That is, with respect to the object of which the thermal history is to be monitored by temperature at different allowable times, the elapsed time for detecting the thermal history at a plurality of set temperatures can be adjusted by allowing the molten permeating material (10) to permeate the permeation body (20) depending on the first melting point of the first permeating material (11), the second melting point of the second permeating material (12), and the ratio of the first permeating material (11) to the second permeating material (12) and the like. In this way the thermal history at a plurality of set temperatures can be detected by the single permeating material (10) without providing a plurality of permeating materials for each set temperature. Therefore, it is possible to detect the thermal history over the temperature range to be monitored while suppressing an increase in the label size.

As shown in FIG. 20, a reagent kit (500) of the present invention includes a thermal history detection label (100) according to the above invention, a container (510) containing a reagent (512) to be used for measurement of a sample by a sample measuring device (550), and the thermal history detection label (100) is attached to the container (510).

In the reagent kit (500) of the present invention, since the thermal history detection label (100) according to the present invention is attached to the container (510) containing the reagent (512), there is no need to provide a plurality of permeating materials for each set temperature inasmuch as the thermal history can be known at a plurality of set temperatures by a single permeating material (10). Therefore, it is possible to detect the thermal history over the temperature range to be monitored while suppressing an increase in the label size. As a result, the thermal history detection label (100) can be easily attached even to the container (510) of the reagent (512) having an easily limited application space, such that the thermal history can be monitored over the temperature range to be monitored for the reagent (512) contained within the container (510).

According to the present invention, it is possible to detect a thermal history over a temperature range to be monitored while suppressing an increase in label size.

BRIEF DESCRIPTION OF THE DRAWINGS

FIG. 4 is a graph showing an example of a DSC curve of a permeating material;

FIG. 5 is a graph showing changes in the flow characteristics of the permeating material depending on the composition of the permeating material;

FIGS. 6A and 6B are schematic diagrams showing an example (A) in which the DSC curves of the constituents of the permeating material are separated and an example (B) in which the DSC curves of the constituents of the permeating material overlap;

DESCRIPTION OF THE EMBODIMENTS OF THE INVENTION

Figure 1A:
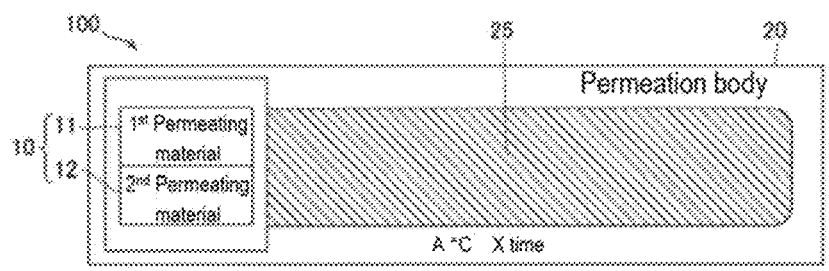
FIGS. 1A and 1B are schematic diagrams describing a thermal history detection label.

Embodiments will be described below with reference to the drawings.

Thermal History Detection Label Summary

The thermal history detection label 100 according to the present embodiment will be described with reference to FIGS. 1A and 1B.

The thermal history detection label 100 detects a thermal history when a molten permeating material 10 permeates a permeation body 20. The label is a sheet-like member that is attached to the surface of an item and represents information related to the item. The label is attached to the object by a method such as adhering to the surface of the object, attaching with an anchor such as a pin, and attaching by being wrapped in a protective sheet adhered to the object. The thermal history detection label 100 is used for managing the thermal history of the object by being attached to the object whose thermal history is to be monitored.

The thermal history detection label 100 includes a permeating material 10 and a permeation body 20.

The permeating material 10 melts at a predetermined temperature or higher. The composition of the permeating material 10 is not limited insofar as it can be melted at a desired temperature. At a temperature lower than a predetermined temperature, the permeating material 10 has a constant shape and does not flow. The state in which the material does not flow in a constant shape is, for example, a solid state, but may be a semi-solid state. When the permeating material 10 reaches a predetermined temperature or higher, the permeating material melts and begins to permeate the permeation body 20. Since the viscosity changes depending on the temperature, the permeating material 10 may be in a solid-liquid mixed state at a predetermined temperature and may be in a completely liquid state at a temperature higher than the predetermined temperature. The melting temperature of the permeating material 10 can be arbitrarily set depending on the constituent material of the permeating material 10.

One or more permeating materials 10 may be provided, but preferably one is provided. The smaller the number of permeating materials 10, the more space can be saved. The permeating material 10 comes into direct contact with the permeation body 20 or is connected to the permeation body 20 through an intermediate member through which the melted permeating material 10 can flow.

The permeation body 20 is configured to absorb the molten permeating material 10 and to absorb the permeating material 10. That is, the permeation body 20 has a gap through which the permeating material 10 melted in the inside and/or the surface can move and permeate. When the permeating material 10 is absorbed by the permeation body 20, the permeating material 10 moves by osmosis in the permeation body 20 according to the amount of absorption. The permeating material 10 moves so as to expand the permeation range 25 in the direction away from the position where it is absorbed by the permeation body 20. The permeation body 20 configured by, for example, an aggregate of fibers such as paper and non-woven fabric, or a porous material. The permeation body 20 may be any absorptive material that allows the permeating material 10 to easily permeate.

When temperature is less than a predetermined temperature, the permeating material 10 does not flow and the thermal history detection label 100 does not change state. When the thermal history detection label 100 reaches a temperature equal to or higher than a predetermined temperature, the permeating material 10 melts and is absorbed by the permeation body 20 so as to permeate the inside of the permeation body 20. The permeation area of the permeating material 10 relative to the permeation body 20 increases as the accumulation time of exposure to a temperature equal to or higher than a predetermined temperature increases. It is possible to detect whether the accumulation time set separately for each temperature is exceeded over the temperature range to be monitored for the object to which the heat history detection label 100 is attached based on the change in the permeation area of the permeating material 10. Although the management of the thermal history of an object is typically used to monitor the degree of deterioration of the object due to heat, the progress of deterioration of the object is not necessarily linear with respect to temperature change, so the degree of deterioration can be evaluated by specific temperature and the duration of exposure to heat.

Specifically, in the present embodiment, the permeating material 10 integrally includes a first permeating material 11 having a first melting point and a second permeating material 12 having a second melting point higher than the first melting point.

The permeating material 10 includes at least a first permeating material 11 and a second permeating material 12, which are a plurality of permeating materials having different melting points. The permeating material 10 may include a third permeating material, a fourth permeating material, a fifth permeating material and the like, each having different melting points, in addition to the first permeating material 11 and the second permeating material 12. In this way, the permeating material 10 is configured as a single permeating material 10 by integrally including a plurality of kinds of permeating materials having different melting points.

Typically, the permeating material 10 does not begin melting below the first melting point. At a temperature equal to or higher than the first melting point and lower than the second melting point, the first permeating material 11 melts and permeates the permeation body 20. Above the second melting point, not only the first permeating material 11 but also the second permeating material 12 are melted and permeate into the permeation body 20.

In this way, in the present embodiment, the thermal history detection label 100 is designed so that a first thermal history of the first thermal history pattern of a first reference temperature and a first accumulation time can be detected, and a thermal history of a second thermal history pattern of a second reference temperature and a second accumulation time can be detected. When the permeating material is composed of a component having a single melting point, the permeating material is completely in the liquid phase and the accumulation time cannot be controlled at a temperature higher than the single melting point; since the permeating material 10 includes a material having a plurality of melting points in the present embodiment, however, the accumulation time can be set separately at each of the plurality of reference temperatures.

Figure 1B:
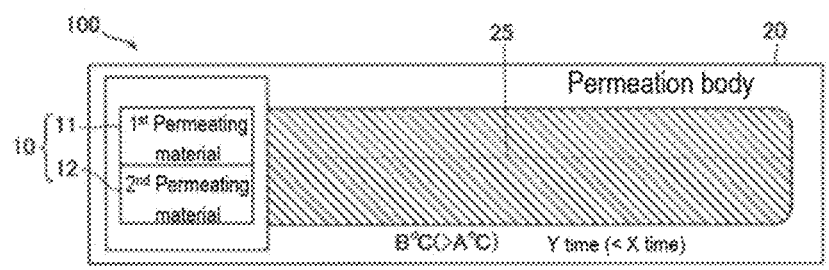

For example, in FIG. 1A, when the permeating material 10 is exposed to the first reference temperature (A [° C.]) for the first accumulation time (X [hours]), the permeating material 10 permeates to the end portion of the permeation body 20. Then, when the permeating material 10 is exposed at the second reference temperature (B [° C.]) for the second accumulation time (Y [hours]), the permeating material 10 permeates to the end portion of the permeation body 20. The second reference temperature is higher than the first reference temperature, and the second accumulation time is shorter than the first accumulation time.

Thermal History Detection Label Effect

In the thermal history detection label (100) according to the embodiment, since the permeating material 10 integrally includes the first permeating material 11 and the second permeating material 12, the flow characteristics of the permeating material 10 at a plurality of set temperatures can be adjusted. That is, with respect to the object of which the thermal history is to be monitored by temperature at different allowable times, the elapsed time for detecting the thermal history at a plurality of set temperatures can be adjusted by allowing the molten permeating material 10 to permeate the permeation body 20 depending on the first melting point of the first permeating material 11, the second melting point of the second permeating material 12, and the ratio of the first permeating material 11 to the second permeating material 12 and the like. In this way the thermal history at a plurality of set temperatures can be detected by the single permeating material 10 without providing a plurality of permeating materials for each set temperature. Therefore, it is possible to detect the thermal history over the temperature range to be monitored while suppressing an increase in the label size.

Structural Example of Permeating Material

Figure 2:
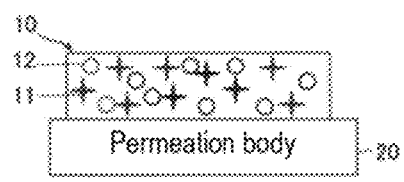
FIG. 2 is a schematic diagram showing a first structural example of a permeating material.

In the example shown in FIG. 2, the permeating material 10 is a mixture of the first permeating material 11 and the second permeating material 12. In the permeating material 10, the first permeating material 11 and the second permeating material 12 are mixed and integrated in an indistinguishable state.

According to this structure, the relationship between the temperature and the fluidity of the permeating material 10 over the temperature range to be monitored can be accurately adjusted by mixing the first permeating material 11 and the second permeating material 12 having different melting points.

Figure 3:
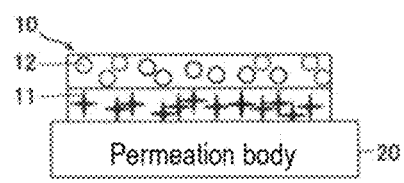
FIG. 3 is a schematic diagram showing a second structural example of a permeating material.

In the example shown in FIG. 3, the permeating material 10 has a laminate structure in which a first permeating material 11 and a second permeating material 12 are laminated. The first permeating material 11 and the second permeating material 12 are laminated on the surface of permeation object 20, for example in a predetermined order.

According to this structure, the amount of the permeating material 10 that permeates the permeation body 20 can be increased stepwise by a temperature state that is equal to or higher than a first melting point and less than a second melting point at which only the first permeating material 11 is melted, and a second temperature state that is equal to or higher than the second melting point at which the second permeating material 12 is melted in addition to the first permeating material 11. Therefore, the difference in the thermal history patterns can be clearly detected.

In the example of FIG. 3, the first permeating material 11 is in contact with the permeation body 20, and the second permeating material 12 is laminated on the first permeating material 11. The second permeating material 12 is provided in a state of not contacting the permeation body 20.

According to this structure, first, the first permeating material 11 permeates the permeation body 20 as the temperature rises, and when the temperature further increases, the second permeating material 12 permeates the permeation body 20. Since the second permeating material 12 is laminated on the first permeating material 11, when the first permeating material 11 permeates the permeation body 20, the solid second permeating material 12 can be prevented from interfering with the permeation.

Constituents of Permeating Material

Although the materials of the first permeating material 11 and the second permeating material 12 are not particularly limited insofar as the materials are stable and do not change their properties over a fixed period of use, and provided the materials have desired flow characteristics at a predetermined temperature. That is, it is desirable that the materials of the first permeating material 11 and the second permeating material 12 have high stability against air, water, acid, base and the like in the environment such as the surrounding atmosphere. Here, "high stability" means that the thermal characteristics of the first permeating material 11 and the second permeating material 12 do not change due to an interaction such as a chemical reaction with the foreign substance.

The first permeating material 11 and the second permeating material 12 contain, for example, an oil component. Examples of the oil component include hydrocarbons, liquid oils and fats, solid oils and fats, waxes, higher fatty acids, higher alcohols, synthetic ester oils, silicone oils and the like. The first permeating material 11 and the second permeating material 12 have different melting points due to the difference in the included oil component. That is, the first permeating material 11 may include a first oil component having a first melting point, and the second permeating material 12 may include a second oil component having a second melting point.

The first permeating material 11 and the second permeating material 12 include, for example, saturated hydrocarbon. It is preferable that the first permeating material 11 and the second permeating material 12 contain saturated hydrocarbon as a main component. The first permeating material 11 and the second permeating material 12 include, for example, 70% by weight or more, 80% by weight or more, 90% by weight or more, 95% by weight or more, or 99% by weight or more of saturated hydrocarbon. The first permeating material 11 and the second permeating material 12 may be a single component of saturated hydrocarbon except for contaminants that are inevitably mixed therewith.

Hydrocarbon is a general term for molecules consisting of carbon and hydrogen. Saturated hydrocarbons are hydrocarbons composed of only single bonds. The saturated hydrocarbon may be linear or cyclic. The saturated hydrocarbon may be any of various isomers represented by the same molecular formula.

Saturated hydrocarbons are hydrocarbons composed of only single bonds, so they have low reactivity, are hardly affected by acids and bases, are hydrophobic, and are not affected by moisture in the air. Therefore, by configuring the first permeating material 11 and the second permeating material 12 with saturated hydrocarbons, it is possible to obtain the permeating material 10 that behaves as designed insofar as possible, in which the melting point and the flow characteristics are less likely to change. As a result, it is possible to reduce individual variations of the thermal history detection labels 100.

Table 1 below shows examples of saturated hydrocarbons and melting points.

TABLE 1

Examples of Saturated Hydrocarbons

| Carbon number | Molecular formula | Name | Melting temperature (° C.) |
| --- | --- | --- | --- |
| 14 | C14H30 | Tetradecane | 6 |
| 15 | C15H32 | Pentadecane | 9.9 |
| 16 | C16H34 | Hexadecane | 18 |
| 17 | C17H36 | Heptadecane | 21 |
| 18 | C18H38 | Octadecane | 28-30 |
| 19 | C19H40 | Nonadecane | 32-34 |
| 20 | C20H42 | Icosane | 36.7 |
| 21 | C21H44 | Heneicosane | 40.5 |
| 24 | C24H50 | Tetracosane | 52 |
| 30 | C30H62 | Triacontane | 65.8 |

The permeating material 10 may include, as the first permeating material 11 and the second permeating material 12, any two saturated hydrocarbons having a melting point according to the temperature range to be monitored may be selected from the saturated hydrocarbons of Table 1, for example. Needless to say, the saturated hydrocarbons in Table 1 above are examples, and saturated hydrocarbons not listed in Table 1 above also may be selected.

Design of Permeating Material

The thermal history pattern until the permeating material 10 reaches the determining unit 30 described later is adjusted by the amount of the permeating material 10, the temperature characteristic regarding the fluidity of the permeating material 10, and the shape of the permeation path of the permeation body 20.

FIG. 4 shows an example of a DSC curve 50 which is the DSC (Differential Scanning calorimetry) analysis result of a saturated hydrocarbon. DSC is an analysis method that measures thermal characteristics such as a melting point by measuring a difference in calories between a measurement sample and a reference substance. In FIG. 4, the vertical axis represents heat flow [mW], and the horizontal axis represents temperature [° C.]. FIG. 4 also shows a DSC curve 50 near the melting point of saturated hydrocarbon.

In the DSC curve 50, the melting of the material is represented as a downward peak indicating an endothermic reaction. The melting point of the substance corresponds to the peak temperature (peak top temperature) 51 of the DSC curve 50. The solid phase substance begins to melt at the onset temperature 52 as the substance temperature rises, and becomes a complete liquid phase at the endset temperature 53. In the permeating material 10 made of saturated hydrocarbon, the fluidity increases (the viscosity decreases) in the temperature range from the rising of the peak to the vicinity of the peak temperature 51, and the fluidity becomes substantially constant at a temperature higher than the peak temperature 51. That is, the permeating material 10 made of a single saturated hydrocarbon exhibits a characteristic that the fluidity changes rapidly with the temperature rise near the melting point.

FIG. 5 is a schematic diagram conceptually showing changes in temperature-fluidity of the permeating material 10 in which a plurality of saturated hydrocarbons are combined. Here, as an example, the flow characteristics of the permeating material 10 in which the three components of the first permeating material 11, the second permeating material 12, and the third permeating material 13 are combined are shown. The fluidity may be considered as the moving speed of the permeating material 10 in the permeation body 20.

In the example shown in FIG. 6A, the permeating material 10 integrally includes a first permeating material 11, a second permeating material 12, and a third permeating material 13 whose DSC curves 50 do not overlap each other. The fact that the DSC curves 50 do not overlap each other means that at least the temperature range from the onset temperature 52 to the endset temperature 53 of the DSC curve 50 (see FIG. 4) does not overlap each other and are separated. For convenience, FIG. 6A shows an example in which all the endothermic peaks from the rising point 54a of each DSC curve 50 (see FIG. 4) to the confluence point 54b with the baseline do not overlap each other.

In the case of FIG. 6A, the flow characteristics of the permeating material 10 change step-wise according to the melting points of the first permeating material 11, the second permeating material 12, and the third permeating material 13 as per the characteristic curve 55a indicated by the solid line in FIG. 5. The shape of the characteristic curve 55a within a desired temperature range can be controlled by adjusting the melting point of each of the permeating materials 11 to 13 included in the permeating material 10, and the content ratio of each of the permeating materials 11 to 13. When the permeating material 10 does not include the third permeating material 13 and includes only the first permeating material 11 and the second permeating material 12, the difference in level has two steps.

In the example shown in FIG. 6B, the permeating material 10 integrally includes a first permeating material 11, a second permeating material 12, and a third permeating material 13 having DSC curves 50 that overlap each other. The overlapping of the DSC curves 50 means that the ranges of the endothermic peaks partially overlap from the rising point 54a of the endothermic peaks of each DSC curve 50 (see FIG. 4) to the confluence point 54b with the baseline.

In the case of FIG. 6B, the temperature ranges near the melting points of the first permeating material 11, the second permeating material 12, and the third permeating material 13 are close to each other. Therefore, as represented by the broken line in FIG. 5, the permeating material 10 has a smoothly curved characteristic curve 55b obtained by combining the characteristic curves of the first permeating material 11, the second permeating material 12, and the third permeating material 13. The shape of the characteristic curve 55b within a desired temperature range can be controlled by adjusting the amount of the permeating material 10, the melting point of each of the permeating materials 11 to 13 included in the permeating material 10, the content ratio of each of the permeating materials 11 to 13, and the like. When the permeating material 10 does not include the third permeating material 13 and includes only the first permeating material 11 and the second permeating material 12, the width of the inclined portion of the characteristic curve 55b becomes narrow.

Since the fluidity shown in FIG. 5 corresponds to the moving speed of the permeating material 10 in the permeation body 20, by controlling the moving speed of the permeating material 10, the accumulation time required to reach the determination unit 30 can be controlled. Therefore, at each temperature included in the temperature range to be monitored, it is possible to configure a permeating material 10 that can reach the determination unit 30 in a desired accumulation time.

Thermal History Detection Label Structure

Figure 7:
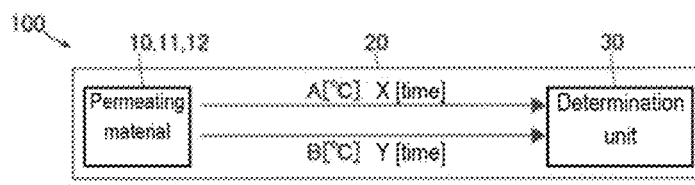
FIG. 7 is a diagram showing a first example of a determination unit of a thermal history detection label.
Figure 8:
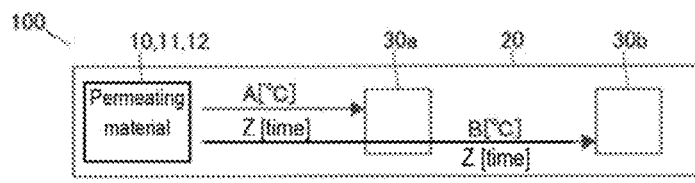
FIG. 8 is a diagram showing a second example of the determination unit of the thermal history detection label.

In the example illustrated in FIGS. 7 and 8, the thermal history detection label 100 includes the determination unit 30 which can be reached by the permeating material 10 via permeation within the permeating body 20, and which can be distinguished by contact with the permeating material 10 that has reached the determination unit 30.

According to this structure, it is possible to easily and clearly determine whether a set thermal history has been detected in the thermal history detection label 100, for example depending on whether the permeating material 10 has contacted the determination unit 30 without measuring the permeation area or permeation length relative to the permeation body 20.

The determination unit 30 is in direct contact with the permeation body 20, or is connected to the permeation body 20 via an intermediate member through which the permeating material 10 can flow. The determination unit 30 also may be a part of the permeation body 20.

The determination unit 30 is configured so that the state changes due to the contact with the permeating material 10 that has reached the determination unit 30. The determination unit 30 irreversibly changes its state due to, for example, contact with the permeating material 10. The determination unit 30 makes a detectable change in, for example, an optical state, an electrical state, a magnetic state, or the like due to the contact with the permeating material 10. The optical characteristics of the determination unit 30 change when the permeating material 10 permeates, for example. In this case, the state change can be visually recognized by changing the visual appearance of the determination unit 30, or the change can be detected by an optical sensor. The determination unit 30 changes from the non-energized state to the energized state or from the energized state to the non-energized state by, for example, contact with the permeating material 10. In this case, a change in the energized state can be detected by a power conversion element such as a current sensor, a light source, or a buzzer. Regarding the change in the magnetic state, the change in the magnetic state can be detected by using a magnetic sensor or a magnetic body. The thermal history detection label 100 also may include a sensor for detecting such a change in state, or the user may use a device including the sensor to detect the change in state of the determination unit 30.

The permeating material 10, the permeation body 20, and the determination unit 30 may be arranged, for example, overlapping in the thickness direction of the thermal history detection label 100. In this case, the permeating material 10 permeates in the thickness direction, for example, through the permeation body 20 toward the determination unit 30 arranged on the front surface side of the thermal history detection label 100. Further, for example, the permeating material 10 and the determination unit 30 may be arranged at positions separated in the plane of the thermal history detection label 100. In this case, the permeating material 10 permeates in the surface direction of the heat history detection label 100 via the permeation body 20 and reaches the determining unit 30. The permeation body 20 plays a role of adjusting the moving time of the permeating material 10 so that the permeating material 10 reaches the determination unit 30 in a designed thermal history pattern.

In the examples of FIGS. 7 and 8, the permeation body 20 is a sheet-shaped paper, and the permeating material 10 is provided at a position separate from the determination unit 30 along the surface direction of the permeation body 20. The permeation body 20 has a strip shape having a first end and a second end, the permeating material 10 is provided at the first end, and the determination unit 30 is provided at the second end side. The permeating material 10 permeates from the first end side of the permeation body 20 toward the second end side and reaches the determining unit 30.

According to this structure, the permeating material 10 is moved in the plane direction by permeation to reach the determination unit 30, so that the length of the permeation path between the permeating material 10 and the determination unit 30 can be easily increased. As a result, it is possible to easily adjust the time required for the permeating material 10 to reach the determination unit 30 at each of the plurality of monitored temperatures.

One or more determination units 30 are provided on the thermal history detection label 100. In the first example shown in FIG. 7, a plurality of thermal history patterns having different reference temperatures and different accumulation times are detected by the thermal history detection label 100. For example, when the permeating material 10 is exposed to the first reference temperature (A [° C.]) for the first accumulation time (X [hours]), the permeating material 10 passes through the permeation body 20 and reaches one determination unit 30, Then, when the permeating material 10 is exposed at the second reference temperature (B [° C.]) for the second accumulation time (Y [hours]), the permeating material 10 passes through the permeation body 20 and reaches one determination unit 30.

The thermal history detection label 100 according to the first example is suitable for management such as the best-by date and expiration date of an article that deteriorates non-linearly due to heat because both the reference temperature and the accumulation time when the state of the determination unit 30 changes are different.

The thermal history detection label 100 according to the second example shown in FIG. 8 includes a first discriminating unit 30a and a second discriminating unit 30b. In the second example, a plurality of thermal history patterns having different reference temperatures and the same accumulation time are detected by the thermal history detection label 100. For example, when the permeating material 10 is exposed to the first reference temperature (A [° C.]) for a predetermined accumulation time (Z [hours]), the permeating material 10 passes through the permeation body 20 and reaches the first determination unit 30a. Then, when the permeating material 10 is exposed at the second reference temperature (B [ ° C.]) for a predetermined accumulation time (Z [hours]), the permeating material 10 passes through the permeation body 20 to the second discriminating unit 30b. The second reference temperature is higher than the first reference temperature, and the second discriminating unit 30b is farther from the permeating material 10 than the first discriminating unit 30a.

The thermal history detection label 100 according to the second example is applied, for example, to evaluate thermal deterioration of during periodic inspections performed at regular intervals on equipment and devices since there are different reference temperatures at which the state of the determination unit 30 changes during the set fixed time.

As described above, in the second example, a plurality of determination units 30 are provided so that the permeating material 10 reaches the different determination units 30 at different thermal accumulation amounts.

According to this configuration, the thermal history detection label 100 is configured such that the state of the first determination unit 30a changes when exposed to the first temperature for a certain accumulation time, and the state of the first determination unit 30a changes when exposed to the second temperature for a certain accumulation time. In this way it is possible to easily determine what kind of heat history has acted on the monitored object in the periodic inspection of the monitored object.

Constricting Portion

Figure 9:
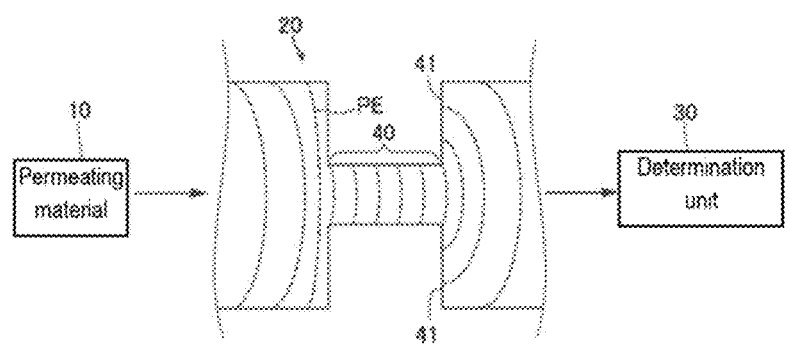
FIG. 9 is a diagram showing an example in which a permeation body is provided with a constricting portion.

As shown in FIG. 9, the permeation body 20 can be provided with a constricting portion 40 having a small cross-sectional area through which the permeating material 10 passes. In the example of FIG. 9, the constricting portion 40 is a portion formed narrower than the other portions of the permeation body 20. The constricting portion 40 may be a portion formed so that the thickness of the permeation body 20 is smaller than that of other portions.

Figure 10:
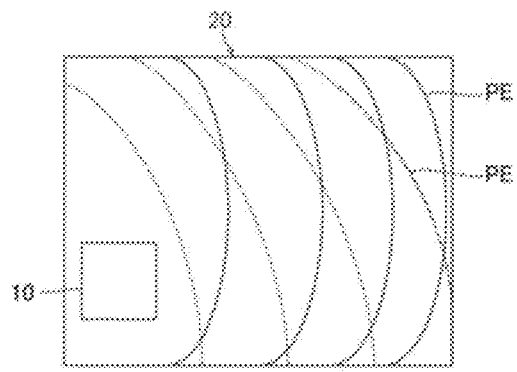
FIG. 10 is a schematic diagram describing a permeation pattern of a permeating material.

The constricting portion 40 will be described. As shown in FIG. 10, in a portion where the width of the permeation body 20 is sufficiently large, the permeating material 10 expands in any direction so as to expand the permeation range. In particular, when the permeation body 20 is a random porous material such as paper, the permeation pattern of the permeating material 10 may be different for each permeation body 20. Note that the permeation pattern is a change over time in the outer edge PE of the permeation region where the permeating material 10 has permeated. For example, the permeation pattern of the permeating material 10 differs for each individual permeation body 20, as in the permeation pattern shown by the solid line and the permeation pattern shown by the broken line in FIG. 10. Such a difference in permeation pattern causes variation in the accumulation time until reaching the determination unit 30.

On the other hand, when the constricting portion 40 is provided as shown in FIG. 9, the passage resistance of the permeating material 10 increases in the constricting portion 40. Therefore, passage of the permeating material 10 is suppressed by the constricting portion 40 until the upstream side of the constricting portion 40 is substantially filled with the permeating material 10. Therefore, the timing at which the permeating material 10 passes through the constricting portion 40 can be controlled. Then, when the permeating material 10 passes through the constricting portion 40, the outlet of the constricted portion 40 becomes the supply point of the permeating material 10, and the permeation progresses from the constricting portion 40 such that the permeation range is expanded. Therefore, even if the permeation pattern of the permeating material 10 on the upstream side of the constricting portion 40 varies, the variation of the permeation pattern is reset by passing through the constricting portion 40.

As described above, according to the configuration in which the constricting portion 40 is provided, it is possible to suppress variation in the passage timing when the permeating material 10 passes through the constricting portion 40. Since the permeation path of the permeating material 10 is restricted in the constricting portion 40, even if the permeation pattern of the permeating material 10 varies on the upstream side of the constricting portion 40, the variation of the permeation pattern on the downstream side of the constricting portion 40 can be reset.

In the example of FIG. 9, the constricting portion 40 is formed by forming the notch 41 in a part of the permeation body 20. Alternatively, the constricting portion 40 also may be formed by forming a impermeable region in which the permeating material 10 does not permeate in the portion of the notch 41. For example, the notch 41 may be impregnated with a resin material having a melting point sufficiently higher than the monitored temperature range to form the impermeable region.

EXPERIMENTAL EXAMPLE

The experimental results regarding the permeation phenomenon by the permeating material 10 will be described. As the permeation phenomenon, generally, a capillary phenomenon and a diffusion phenomenon due to a concentration gradient are known. What is common to both phenomena is that the permeation length in the permeation body is proportional to the square root of time ($\sqrt{t}$), where t is the time of permeation.

In the thermal history detection label 100, in order to detect the thermal history over a longer accumulation time, it is desirable that the permeation be slower than the relationship proportional to the square root of time ($\sqrt{t}$). Therefore, the inventors of the present application conducted the following experiment for verifying the factors affecting the permeation length.

Figure 11:
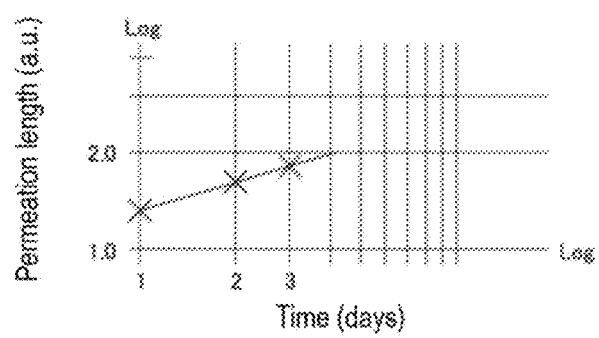
FIG. 11 is a graph showing the experimental results of investigating the relationship between the permeation length of the permeating material and the elapsed time.

The relationship between the permeation length and the permeation time, and particularly the relationship between the permeation length and the amount of the permeating material 10 in an actual thermal history detection label, was experimentally investigated. FIG. 11 is a graph showing the results of an experiment investigating the relationship between the permeation length and the permeation time, where the vertical axis represents the permeation length and the horizontal axis represents the elapsed time. The experiment measured the permeation length permeating toward the second end with the permeating material 10 arranged at the first end of a strip-shaped permeation body 20. The permeation length was determined as a relative value with respect to the unit length, with a constant unit length of the permeation body 20 being 1. The permeation length is said to be proportional to the square root of time, but in FIG. 11, the permeation length proceeded in proportion to the cube root of time.

Figure 12:
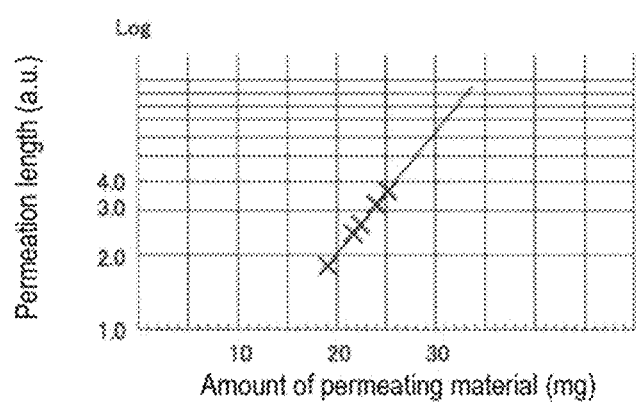
FIG. 12 is a graph showing the results of an experiment investigating the relationship between the amount of permeating material and the permeation length.

FIG. 12 is a graph showing the experimental results of investigating the relationship between the permeation length and the amount of the permeating material 10, where the vertical axis represents the permeation length and the horizontal axis represents the amount of the permeating material. FIG. 12 shows the experimental results in which the permeation length after 3 days was plotted by changing the amount of the permeating material 10 with five amounts of 19.2 mg, 21.6 mg, 23.5 mg, 24 mg, and 25.4 mg. The permeation length proceeded in proportion to the index of the amount of the permeating material 10.

From the experimental results shown in FIG. 11 and FIG. 12, the quantitative dependence of the permeation length of the permeation material 10 was utilized to provide a constricting portion 40 in the middle of the permeation body 20 to reduce the amount of the permeating material 10 that enters the permeation body 20 and continue within the permeation by 20. If the permeation amount is reduced by the constricting portion 40, the permeation length within a certain period is reduced, and the permeation is delayed.

In order to effectively obtain the effect of the constricting portion 40, it is preferable to provide the constricting portion 40 at a plurality of positions on the permeation path. In particular, it is preferable that the upstream constricting portion 40 and the downstream constricting portion 40 are respectively provided at diagonal positions of the permeation region between the upstream constricting portion 40 and the downstream constricting portion 40.

First Structural Example of Thermal History Detection Label

A more specific first structural example of the thermal history detection label 100 is shown with reference to FIGS. 13 to 17.

Figure 13:
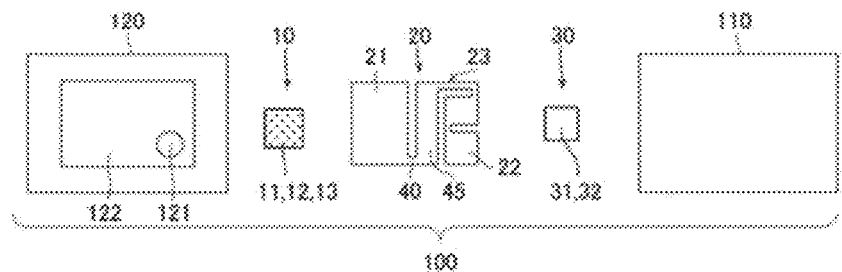
FIG. 13 is an exploded view describing a first specific structural example of the thermal history detection label.
Figure 14:
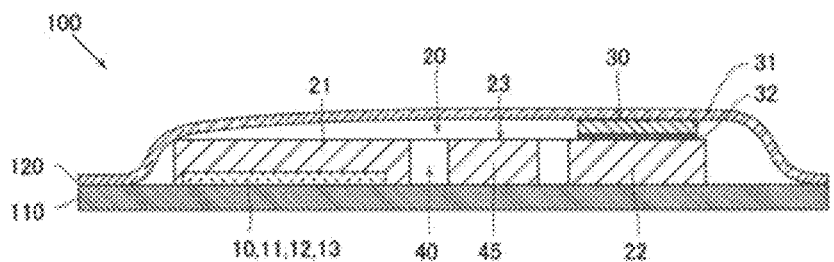
FIG. 14 is a cross-sectional view describing the structure of the thermal history detection label shown in FIG. 13.
Figure 15:
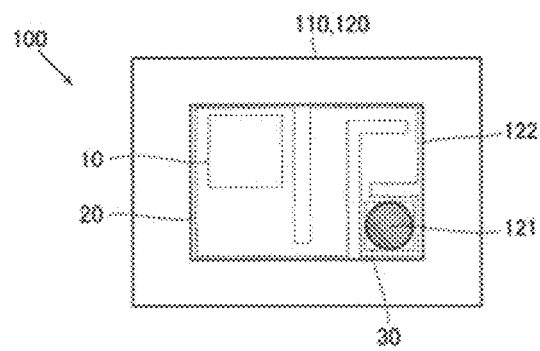
FIG. 15 is a plan view of the thermal history detection label shown in FIG. 13.

The thermal history detection label 100 shown in FIGS. 13 to 15 includes a permeating material 10, a permeation body 20, a determination unit 30, a base material 110, and a cover material 120.

The base material 110 has a sheet-like shape. The base material 110 is, for example, a white resin film such as PET (polyethylene terephthalate). One surface of the base material 110 is an installation surface on which the permeating material 10, the permeation body 20, and the determination unit 30 are installed, and the other surface is an adhesion surface. The other surface of the base material 110 is the back surface of the thermal history detection label 100, and is an adhesive surface for adhering the label to an object. One surface side of the base material 110 is a display surface side that can be visually recognized from the outside in the attached state.

The permeation body 20 is a sheet-shaped paper. The permeation body 20 has a first end and a second end and includes one permeation path that is bent a plurality of times in a plan view. The permeation body 20 has a rectangular outer shape as a whole.

In FIG. 14, the permeating material 10 and the determining unit 30 are provided so as to directly contact the permeation body 20. The determination unit 30 is provided on one surface of the permeation body 20. The permeating material 10 may be provided on either one surface or the other surface of the permeation body 20, but is provided on the other surface in the example of FIG. 14.

The permeating material 10 is arranged at a position overlapping with the first end of the permeation body 20. Specifically, the permeating material 10 is provided in a form in which the molten permeating material 10 is absorbed in a sheet-shaped storage member, and is adhered to the surface of the permeation body 20. The storage member is, for example, paper, a porous member, or the like. The permeating material 10 is solidified in a state in which it is absorbed by the storage member, and when melted, it leaches out from the storage member and is absorbed by the permeation body 20. By absorbing the permeating material 10 in the storage member, the amount (volume) of the permeating material 10 can be quantified more accurately than in the case where a solid mass of the permeating material 10 is directly installed.

In the examples of FIGS. 13 to 15, the determination unit 30 is configured so that its visual appearance changes due to contact with the permeating material 10.

With this configuration, it is possible to easily determine at a glance that the state of the determination unit 30 has changed without using a sensor or the like. Therefore, a small thermal history detection label 100 can be configured with a structure that is as simple as possible.

The determination unit 30 absorbs the permeating material 10 to change its optical characteristics. Specifically, as shown in FIG. 14, the determination unit 30 includes an opaque cover portion 31 on the front surface side and a color portion 32 on the back surface side. The cover portion 31 and the color portion 32 have different colors. For example, the cover portion 31 is white and the color portion 32 is red. In the state in which the permeating material 10 is not absorbed, the cover portion 31 is visually recognized in the determination unit 30. When the permeating material 10 is absorbed, the cover portion 31 becomes transparent, and the color portion 32 becomes visible through the transparent cover portion 31. As a result, the determination unit 30 absorbs the permeating material 10 and the color appears to change. The determination unit 30 changes state based on the change in the visual appearance from the color of the cover unit 31 to the color of the color unit 32, which can be readily grasped The change in the visual appearance of the determination unit 30 may be a change in the display pattern such as a character, a picture, or a figure, or a combination of the change in the color and the display pattern, in addition to the simple change in the color. The change of the display pattern may be any of the appearance of a display pattern from a non-display state, the disappearance of a displayed display pattern, and a morphological change of a displayed pattern.

Figure 16:
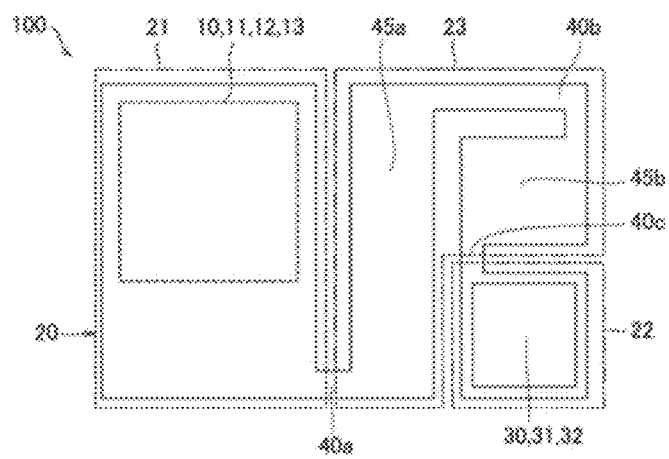
FIG. 16 is a plan view showing a structure of a penetration body in a first specific structural example.

As shown in FIG. 16, the determination unit 30 is arranged at a position overlapping the second end of the permeation body 20. The determination unit 30 has a sheet-like shape and is attached to one surface of the permeation body 20. The determination unit 30 has an area that is at least visible from the outside of the thermal history detection label 100.

Returning to FIG. 14, the cover material 120 is provided so as to cover the permeating material 10, the permeation body 20, and the determining unit 30 provided on one surface of the base material 110. The permeating material 10, the permeation body 20, and the determining unit 30 are enclosed by the base material 110 and the cover material 120 and are isolated from the outside. The cover material 120 is configured so that at least the determination unit 30 can be visually recognized from the outside. In the example of FIG. 15, the cover material 120 has a transparent window portion 121 formed at a position overlapping the determination unit 30, and the shield portion 122 other than the window portion 121 is formed of an opaque material. FIG. 15 shows the determination unit 30 visually recognized through the window 121, and for convenience, indicates that the visual appearance of the determination unit 30 has changed by hatching.

Structure of Permeation Body

As shown in FIG. 16, the permeation body 20 connects the first portion 21 provided with the permeating material 10, the second portion 22 provided with the determination unit 30, and the third portion 23 connecting between the first portion 21 and the second portion 22. The permeation body 20 has a structure in which the first portion 21 arranged at the first end and the second portion 22 arranged at the second end are connected by a single third portion 23 forming the permeation path.

The first portion 21 includes the installation region of the permeating material 10 as described above. The permeating material 10 is adhered to the permeation body 20 at a predetermined position of the first portion 21 while being superposed on the permeation body 20. The molten permeating material 10 is absorbed by the permeation body 20 in the first portion 21, and permeates from the first portion 21 to the determining unit 30 of the second portion 22 via the third portion 23. The first portion 21 is formed in such a size that a sufficient amount of the permeating material 10 can be installed so that the molten permeating material 10 can spread to the third portion 23 and the second portion 22.

The second portion 22 includes the installation area of the determination unit 30 as described above. The determination unit 30 is adhered in the second portion 22 in a state of being superimposed on one surface side of the permeation body 20. The second portion 22 is formed in a size that allows the change of color of the determination unit 30 to be confirmed from the outside of the thermal history detection label 100.

The third portion 23 is formed so as to have a path length according to the accumulation time until the permeating material 10 reaches the determination unit 30. In the example of FIG. 16, the third portion 23 has a shape bent a plurality of times in order to secure a path length corresponding to the accumulation time.

In the example of FIG. 16, the third portion 23 includes constricting portions 40a to 40c having a small cross-sectional area through which the permeating material 10 passes. Note that in the example of FIG. 16, the permeation body 20 is a single sheet-shaped member (see FIG. 14) and has a substantially constant thickness. Therefore, the cross-sectional area depends on the width of the portion. In the example of FIG. 16, the constricting portions 40a to 40c are portions which are narrower than other portions.

As described above, according to the configuration in which the constricting portions 40a to 40c are provided in the third portion 23, it is possible to suppress variation in the passage timing when the permeating material 10 passes through the constricting portions 40a to 40c. As a result, even if the path length of the third portion 23 is increased so as to be able to cope with long-term thermal history detection, it is possible to suppress variations in the timing at which the permeating material 10 reaches the determination unit 30. In addition, since the permeation path of the permeating material 10 is restricted in the constricting portions 40a to 40c, even if the permeation pattern of the permeating material 10 varies on the upstream side of the constricting portions 40a to 40c, the variation of the permeation pattern can be reset on the downstream side of the constricting portions 40a to 40c. As a result, even if the path length of the third portion 23 is increased, it is possible to suppress variations in the permeation pattern of the permeating material 10 and reduce individual differences in the thermal history detection label 100.

In the example of FIG. 16, the permeation body 20 includes a plurality of constricting portions. That is, the permeation body 20 includes three constricting portions 40a to 40c.

According to this structure, it is possible to suppress variation in the passage timing when the permeating material 10 passes through each of the plurality of constricting portions 40a to 40c. The larger the path length of the third portion 23, the more likely the permeation pattern of the permeating material 10 is to vary. On the other hand, the plurality of constricting portions 40a to 40c make it possible to align the passage timing of the permeating material 10 at a plurality of points along the permeation path. As a result, even if the path length of the third portion 23 is increased so as to be able to cope with long-term thermal history detection, it is possible to suppress variations in the timing at which the permeating material 10 reaches the determination unit 30.

In the example of FIG. 16, the third portion 23 is divided into a plurality of regions by the plurality of constricting portions 40a to 40c. The third portion 23 has passage portions 45a and 45b having a larger cross-sectional area than the constricting portions 40a to 40c disposed between the plurality of constricting portions 40a to 40c. That is, the third portion 23 includes the passage portion 45a between the constricting portions 40a and 40b and the passage portion 45b between the constricting portions 40b and 40c.

Figure 17:
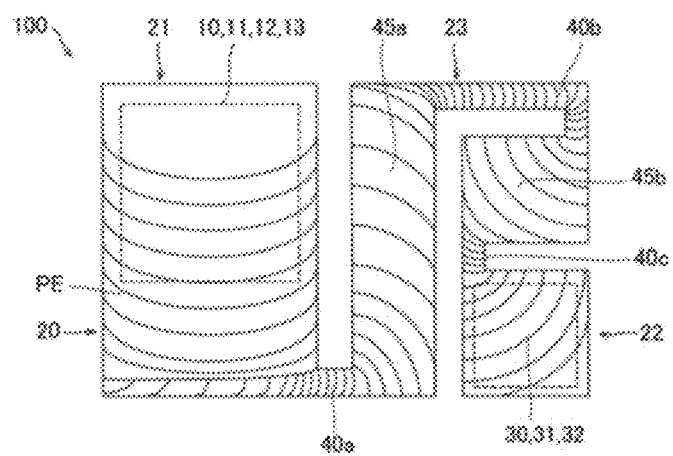
FIG. 17 is a schematic diagram describing a penetration pattern of a permeating material in FIG. 16.

The constricting portion 40a is provided at the connection position between the first portion 21 and the third portion 23. As shown in FIG. 17, when the permeating material 10 supplied to the first portion 21 reaches the constricting portion 40a, the moving speed of the outer edge PE of the permeating material 10 decreases, and the first portion 21 is substantially filled with the permeating material 10, and thereafter passes through the constricting portion 40a. Therefore, the variation of the permeation pattern in the first portion 21 and the variation of the passage timing through the constricting portion 40a are suppressed by the constricting portion 40a.

In the example of FIG. 16, the constricting portion 40b is provided at an intermediate position of the third portion 23. A region between the constricting portions 40a and 40b is formed by a passage portion 45a having a larger cross-sectional area than the constricting portions 40a and 40b. As shown in FIG. 17, in the passage portion 45a, the permeation proceeds so that the permeation range expands from the outlet of the constricting portion 40a. When the passage portion 45a is substantially filled with the permeating material 10, the permeating material 10 enters the constricting portion 40b and passes through the constricting portion 40b. Therefore, the variation of the permeation pattern in the passage portion 45a and the variation of the passage timing of the constricting portion 40b are suppressed by the constricting portion 40b.

In the example of FIG. 16, the constricting portion 40c is provided at the connection position between the second portion 22 and the third portion 23. A region between the constricting portions 40b and 40c is formed by a passage portion 45b having a larger cross-sectional area than the constricting portions 40b and 40c. As shown in FIG. 17, in the passage portion 45b, the permeation proceeds so that the permeation range expands from the outlet of the constricting portion 40b. When the passage portion 45b is substantially filled with the permeating material 10, the permeating material 10 enters the constricting portion 40c and passes through the constricting portion 40c. Therefore, the variation of the permeation pattern in the passage portion 45b and the variation of the passage timing of the constricting portion 40c are suppressed by the constricting portion 40c.

In this way, if the constricting portion 40c is provided at the connection position between the second portion 22 and the third portion 23, the permeating material 10 passes through the constricting portion 40c immediately before the determination unit 30, and variation in timing to reach the determination unit 30 is effectively suppressed. Therefore, the detection accuracy of the heat history detection label 100 can be improved. Further, the constricting portion 40c has an effect of allowing the permeating material 10 to reach the determination unit 30 after the permeating material 10 is stored in the passage portion 45b immediately before the determining unit 30. Since a sufficient amount of the permeating material 10 can be secured immediately before the determination unit 30, it is possible to prevent a state change of the determination unit 30 from becoming unclear due to an insufficient amount reaching the determination unit 30.

Figure 18:
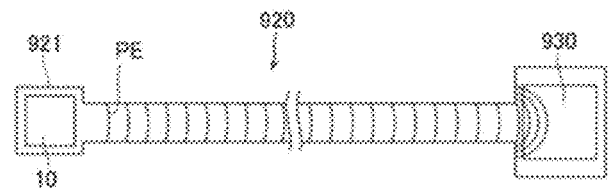
FIG. 18 is a schematic diagram describing a permeation pattern of a permeating material according to a comparative example.

That is, when there is no passage with a large cross section and the cross-sectional area of the permeation body 920 is continuously constricted to the connection with the determination unit 930 as in the comparative example shown in FIG. 18, the flow rate of the permeating material 10 also decreases due to the increase in the passage resistance in addition to the decrease in the flow rate of the permeating material 10 as the path length from the first portion 921 becomes longer. On the other hand, in the determination unit 930 whose visual appearance changes, an area equal to or larger than a certain value is obtained. Therefore, in the configuration of the comparative example of FIG. 18, it takes time from when the permeating material 10 starts to flow into the determination unit 930 until the determination unit 930 is filled with the amount of the permeating material 10 required to change the appearance. In this case, the change rate of the appearance of the determination unit 930 becomes very small, which makes it difficult to visually determine the change in the appearance.

On the other hand, in the configuration of FIG. 17, since a sufficient amount of the permeating material 10 is stored in the passage portion 45b immediately before the determination unit 30 by the constricting portion 40c and the permeating material 10 flows into the second portion 22, a shortage of the inflow amount of the permeating material 10 into the determination unit 30 is suppressed, and a rapid state change is realized.

In the configuration examples of FIGS. 16 and 17, the constricting portions 40 are provided at diagonal positions of the upstream ends and the downstream ends of the passage portions 45a and 45b, respectively. That is, the upstream constricting portion 40a and the downstream constricting portion 40b are respectively provided at positions diagonal to the rectangular passage portion 45a. The upstream constricting portion 40b and the downstream constricting portion 40c are respectively provided at diagonal positions of the rectangular passage portion 45b.

According to this structure, since the downstream constricting portion 40 is arranged at the farthest position from the upstream constricting portion 40 among the passage portions 45a and 45b, the passage portions 45a and 45b are filled with the permeating material 10, then the effect of the permeating material 10 passing through the constricting portion 40 on the downstream side can be more effectively obtained. In this way it is possible to effectively lengthen the time required for the permeating material 10 to pass through the passage portions 45a and 45b while suppressing the variation in the permeation speed of the permeating material 10. As a result, it is possible to obtain a thermal history detection label 100 that is more compact and can detect the thermal history over a longer accumulation time.

Application Example of Thermal History Detection Label

Next, a reagent kit 500 of the present embodiment will be described with reference to FIGS. 19 and 20. The thermal history detection label 100 shown in FIGS. 13 to 17 is applied to quality control of a reagent kit 500 used for sample testing, for example. The reagent kit 500 includes a container 510 in which a reagent 512 used for a sample test is previously stored. Quality control of the reagent 512 in the container 510 can be performed by monitoring the thermal history using the thermal history detection label 100.

Figure 19:
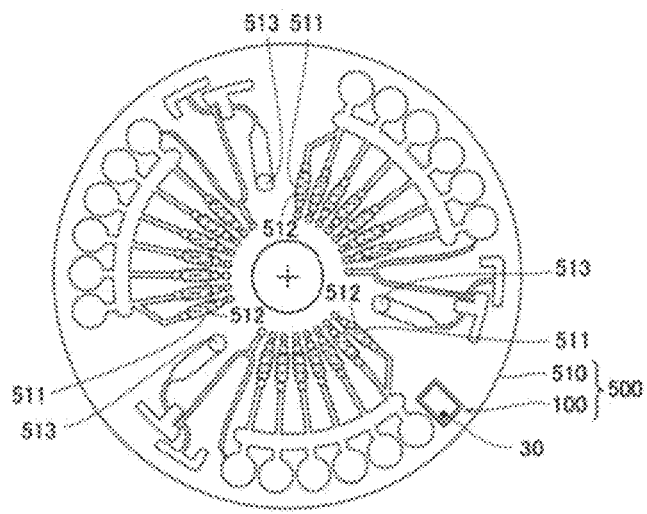
FIG. 19 is a diagram showing a reagent kit that is a first application example of a thermal history detection label.

As shown in FIG. 19, the reagent kit 500 of the present embodiment includes the thermal history detection label 100 and a container 510 containing a reagent 512. The container 510 is a test cartridge that contains a test reagent 512 in advance and is used to detect a test substance contained in a sample. The container 510 has a plurality of reagent storage units 511. The reagent storage unit 511 is a hollow space formed inside the container 510, and stores a reagent 512 corresponding to an inspection item in advance. The thermal history detection label 100 is attached to the container 510.

Figure 20:
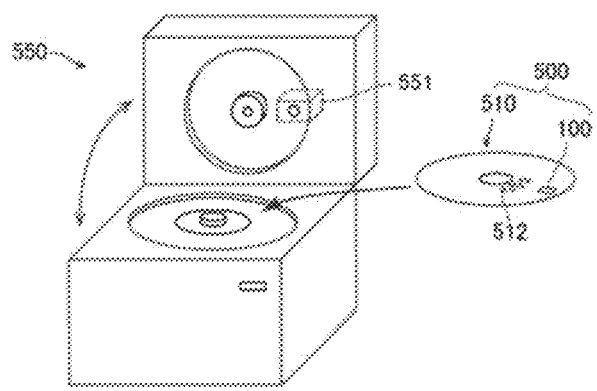
FIG. 20 is a diagram showing a sample measuring device that performs measurement using the reagent kit of FIG. 19.

As shown in FIG. 20, the container 510 is used for measuring the sample by a sample measuring device 550. Specifically, the container 510 has a sample introduction port 513 (see FIG. 19), and the sample containing the test substance is introduced into the container 510 from the sample introduction port 513. The container 510 in which the sample is introduced is installed in the sample measuring device 550. The test substance and the reagent 512 (see FIG. 19) react in the container 510 by the operation of the sample measuring device 550. Due to the reaction between the test substance and the reagent 512, a detectable signal due to the test substance is generated from the inside of the container 510. The sample measuring device 550 measures the test substance by detecting the signal generated from the inside of the container 510. The container 510 is a replaceable consumable item. That is, the container 510 is discarded after being used for measurement a preset number of times.

The thermal history detection label 100 is attached to the surface of the container 510, for example. The container 510 is usually transported and stored in a refrigerated state. Therefore, in the normal state, the color of the determination unit 30 of the thermal history detection label 100 does not change. When using the container 510, the user checks the thermal history detection label 100 attached to the surface of the container 510. When the color of the determination unit 30 changes, it can be understood that the container 510 has been exposed to a thermal history pattern that exceeds the allowable time at least at any one of the reference temperatures.

For example, the sample measuring device 550 may be provided with an imaging unit 551 capable of imaging the surface and the inside of the container 510. The sample measuring device 550 images the thermal history detection label 100 by the imaging unit 551 when the container 510 is set and the measurement operation is started. The sample measuring device 550 determines the color of the determination unit 30 in the captured image by image processing, and determines whether the color of the determination unit 30 has changed. If the color of the determination unit 30 has changed, the sample measuring device 550 stops the measurement operation using the container 510.

In the reagent kit 500 of the present embodiment, since the thermal history detection label 100 is attached to the container 510 containing the reagent 512, a single permeating material 10 can be used without providing a plurality of permeating materials for each set temperature, and it is possible to detect thermal history at a plurality of set temperatures. Therefore, it is possible to detect the thermal history over the temperature range to be monitored while suppressing an increase in the label size. As a result, the thermal history detection label 100 can be easily attached even to the container 510 of the reagent 512 where the application space is easily limited, and the thermal history of the reagent 512 contained in the container 510 can be monitored over the temperature range to be monitored.

The test substance is, for example, a substance contained in a sample collected from a human being who is a subject. The sample is blood (whole blood, serum or plasma), urine, tissue fluid or other body fluids, or a fluid obtained by subjecting collected body fluid or blood to a predetermined pretreatment. The test substance can be, for example, a protein such as an antigen or an antibody, a peptide, cells and intracellular substances, a nucleic acid such as DNA (deoxyribonucleic acid).

The reagent 512 emits light according to the amount of the test substance, for example. Luminescence is, for example, chemiluminescence or fluorescence. The reagent 512 contains, for example, a labeling substance that specifically binds to the test substance. The labeling substance can be a chemiluminescent or fluorescent substance. For example, the labeling substance includes an enzyme, and the reagent includes a luminescent substrate that reacts with the enzyme. By detecting the light emitted from the measurement sample in the container 510, the presence or absence of the test substance according to the measurement item, the amount or concentration of the test substance, and the size and shape of a particulate test substance can be measured.

The type of reagent 512 contained in the container 510 differs depending on the measurement item. The reference temperature and the permissible time for maintaining quality are different for each type of the reagent 512.

Figure 21:
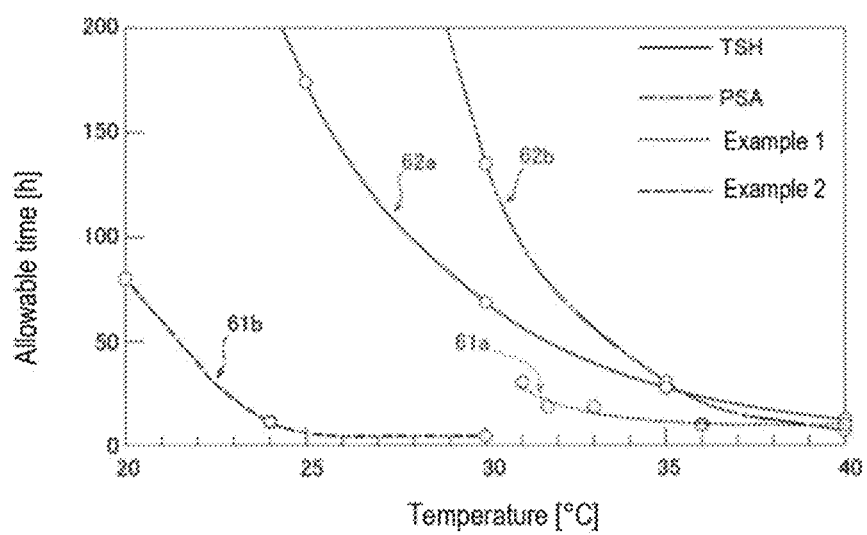
FIG. 21 is a graph showing a first change curve and a second change curve in the first specific structural example.

As an example, FIG. 21 shows the second change curves 62*a* and 62*b* which are the permissible times of the monitoring target at each temperature. The second change curve 62*a* is a plot of the permissible time at each temperature of the reagent used for the measurement item of TSH (thyroid stimulating hormone). The second change curve 62*b* is a plot of the permissible time at each temperature of the reagent used for the PSA (prostate-specific antigen) measurement item. As illustrated by these second change curves 62*a* and 62*b*, the allowable time for which the quality of the reagent used for the sample test can be maintained generally shows an exponential change according to the Arrhenius equation. A curve that follows the Arrhenius equation is called an Arrhenius curve.

As an example, in the second change curves 62*a* and 62*b* of FIG. 21, the temperature range to be monitored is set to 30 [° C.] or more and 40 [° C.] or less. The reagent kit 500 is transported and stored, for example, in a refrigerated state of about 2[° C.] to 8[° C.]. The temperature range to be monitored is a temperature range that deviates from the normal storage state when the reagent kit 500 is left in a room temperature environment during transportation or storage.

In FIG. 21, in the second change curve 62*a* of the TSH reagent, the allowable time at 30 [° C.] is about 70 [h], the allowable time at 35 [° C.] is about 28 [h], and at 40 [° C.] the allowable time is about 12 [h]. In the second change curve 62*b* of the PSA reagent, the allowable time at 30 [° C.] is about 135 [h], the allowable time at 35 [° C.] is about 30 [h], and the allowable time at 40 [° C.] is about 7 [h].

In the thermal history detection label 100 shown in FIGS. 13 to 17, the permeating material 10 is configured so that the first change curves 61*a* and 61*b* of the arrival time at the determination unit 30 at each temperature from the first melting point to the second melting point, obtain a shape along the second change curve 62*a* of the TSH reagent or along the second change curve 62*b* of the PSA reagent. That is, the thermal history detection label 100 is configured such that the first change curves 61*a* and 61*b* are along the Arrhenius curve. Further, the permeating material 10 is configured such that the time required for reaching the determination unit 30 at each temperature from the first melting point to the second melting point is shorter than the allowable time at each temperature. That is, in the graph shown in FIG. 21, the first change curves 61*a* and 61*b* exist below the second change curve 62*a* of the TSH reagent or the second change curve 62*b* of the PSA reagent.

With this configuration, the change in the accumulation time until the state of the determination unit 30 changes at each temperature over the temperature range to be monitored can follow the change in the allowable time of the second change curve 62*a* of the TSH reagent or the second change curve 62*b* of the PSA reagent at each temperature. As a result, over the temperature range to be monitored, the detection of the thermal history corresponding to the allowable time in the second change curve 62*a* of the TSH reagent or the second change curve 62*b* of the PSA reagent can be realized by the single permeating material 10.

The permeating material 10 integrally includes a plurality of permeating materials (see FIG. 6B) in which the respective DSC curves 50 overlap each other in order to exponentially change the accumulation time for each reference temperature until the state of the determination unit 30 changes along the second change curves 62*a* and 62*b*. In this way, as in the characteristic curve 55*b* of FIG. 5, the permeating material 10, the fluidity of which changes exponentially for each reference temperature, is obtained.

Example 1

In example 1, the permeating material 10 includes a first permeating material 11, a second permeating material 12, and a third permeating material 13 in which the DSC curves 50 overlap each other. The first permeating material 11, the second permeating material 12, and the third permeating material 13 are saturated hydrocarbons. Specifically, the first permeating material 11 is C18H38 (octadecane), the second permeating material 12 is C19H40 (nonadecane), and the third permeating material 13 is C20H42 (icosane). The first melting point of the first permeating material 11 is 28 [° C.] to 30 [° C.]. The second melting point of the second permeating material 12 is 32[° C.] to 34[° C.]. The third melting point of the third permeating material 13 is 36.7 [° C.]. The permeating material 10 is a mixture in which the first permeating material 11, the second permeating material 12, and the third permeating material 13 are mixed in a weight ratio of 1:1:1.

As a result of applying the permeating material 10 according to Example 1 to the thermal history detection label 100 shown in FIGS. 13 to 17, the first change curve 61a shown in FIG. 21 was obtained. In the first change curve 61a, when the reference temperature is 31 [° C.], the accumulation time is about 31 [h], when the reference temperature is 36 [° C.], the accumulation time is about 10 [h], and when the reference temperature is 40 [° C.], the the time is about 10 [h]. As can be understood from FIG. 21, the first change curve 61a has a shape along the along the second change curves 62a and 62b over the range from the first melting point (30[° C.]) to the second melting point (34[° C.]). The first change curve 61a has a shape along the second change curves 62a and 62b over the range of the first melting point (30 [° C.]) to the third melting point (36.7 [° C.]).

Example 2

In the Example 2, the permeating material 10 includes the first permeating material 11, the second permeating material 12, and the third permeating material 13 with DSC curves 50 overlap each other. The first permeating material 11, the second permeating material 12, and the third permeating material 13, a combination of saturated hydrocarbons different from that of Example 1 was selected. Specifically, the first permeating material 11 is C16H34 (hexadecane), the second permeating material 12 is C17H36 (heptadecane), and the third permeating material 13 is C18H38 (octadecane). The melting point of the first permeating material 11 is 18[° C.]. The melting point of the second permeating material 12 is 21 [° C.]. The melting point of the third permeating material 13 is 28[° C.] to 30[° C.]. The permeating material 10 is a mixture in which the first permeating material 11, the second permeating material 12, and the third permeating material 13 are mixed in a weight ratio of 1:1:1.

As a result of applying the permeating material 10 according to Example 2 to the thermal history detection label 100 shown in FIGS. 13 to 17, the first change curve 61b shown in FIG. 21 was obtained. In the first change curve 61b, when the reference temperature is 20 [° C.], the accumulation time is about 80 [h], when the reference temperature is 24 [° C.], the accumulation time is about 12 [h], and when the reference temperature is 30 [° C.], the time is about 4 [h]. As can be seen from FIG. 21, the first change curve 61b has a shape along the second change curves 62a and 62b over the range from the first melting point (18[° C.]) to the second melting point (21[° C.]). The first change curve 61b has a shape along the second change curves 62a and 62b over the range of the first melting point (18[° C.]) to the third melting point (28[° C.]).

In Examples 1 and 2, the permeating material 10 is configured of a combination of saturated hydrocarbons having continuous carbon numbers as the first permeating material 11, the second permeating material 12, and the third permeating material 13. In this way, since the melting points of the respective permeating materials approach each other, it is possible to overlap the DSC curves 50 with each other and smoothly change the accumulation time for changing the state of the determination unit 30 along the second change curves 62a and 62b.

Further, in Examples 1 and 2, the permeating material 10 integrally includes two or more kinds of waxes having a melting point of 18° C. or higher and 40° C. or lower. In this way it possible to obtain the permeating material 10 having a flow characteristic capable of flexibly responding to a desired permissible time within a temperature range to be monitored in terms of quality control of the reagent 512 used for measuring a sample collected from a human.

Second Structural Example of Thermal History Detection Label

Figure 22:
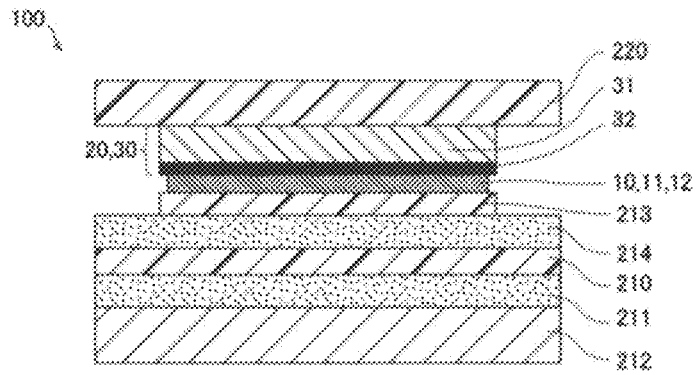
FIG. 22 is a cross-sectional view describing a second specific structural example of the thermal history detection label.
Figure 23:
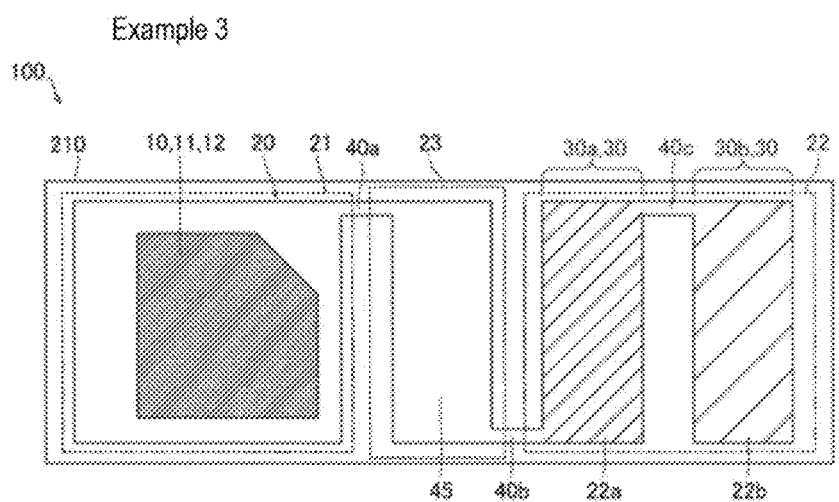
FIG. 23 is a plan view showing a structure of a permeation body in a second specific structural example.
Figure 24:
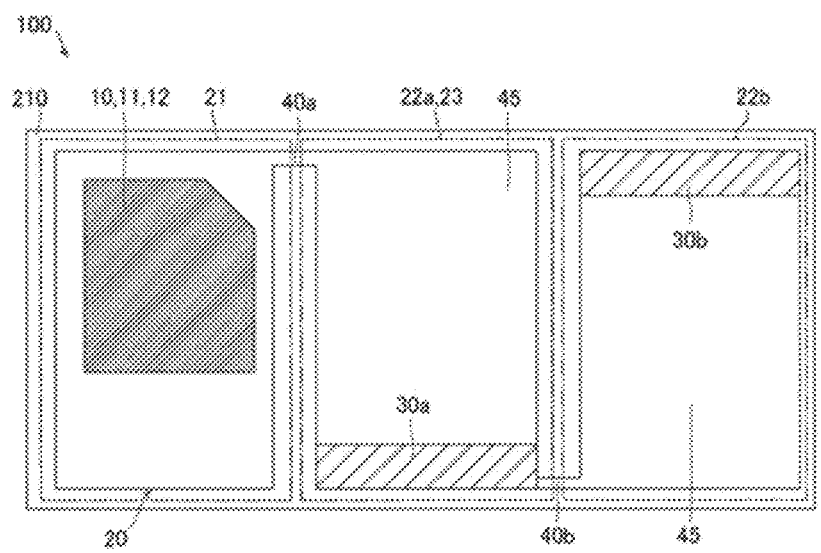
FIG. 24 is a plan view showing another structure of the permeation body in the second specific structural example.

Referring to FIGS. 22 to 24, a specific second structural example of the thermal history detection label 100 is shown.

The thermal history detection label 100 shown in FIG. 22 includes a permeating material 10, a permeation body 20, a determination unit 30, a base material 210, and a cover material 220.

The base material 210 has a sheet-like shape. The base material 210 is, for example, a white resin film such as PET (polyethylene terephthalate). The other surface of the base material 210 is coated with a pressure sensitive adhesive 211 and serves as an adhesive surface. The adhesive surface is covered with a release paper 212. One surface side of the base material 210 is a display surface side that can be visually recognized from the outside in the attached state.

The base material 210 includes a film 213 that configures one surface. The film 213 is provided on the base material 210 via the adhesive 214. The film 213 is transparent and is made of a resin film such as PET.

The permeating material 10 and the permeation body 20 are provided on the surface of the film 213. The permeating material 10 is sandwiched between the permeation body 20 and the film 213. That is, the permeating material 10 is provided on the back surface (other surface) side of the permeation body 20. The permeating material 10 may be provided on the surface (one surface) side of the permeation body 20, and in this case, the permeating material 10 is not in contact with the film 213.

As shown in FIG. 3, the permeating material 10 has a laminated structure in which a first permeating material 11 and a second permeating material 12 are laminated. The first permeating material 11 is in contact with the permeation body 20, and the second permeating material 12 is laminated on the first permeating material 11.

The permeation body 20 has a sheet-like shape and is provided on the surface of the film 213. Note that, the permeation body 20 is provided so as to overlap the permeating material 10 and is not in direct contact with the film 213 at the formation position of the permeating material 10 shown in FIG. 22, and, except for the position at which the permeating material 10 is formed, the permeation body 20 is provided in a state of directly contacting the surface of the film 213. The permeation body 20 (see FIGS. 23 and 24) has a first end and a second end, and configures one permeation path that is bent a plurality of times in a plan view. The permeation body 20 has a rectangular outer shape as a whole. The permeating material 10 permeates the inside of the permeation body 20 along the surface direction of the permeation body 20.

The determination unit 30 is formed integrally with the permeation body 20. That is, a part of the permeation body 20 is configured as the determination unit 30.

The configuration of the determination unit 30 is similar to that of the first structural example. That is, the determination unit 30 includes the opaque cover portion 31 on the front surface side and the color portion 32 on the back surface side. When the cover portion 31 absorbs the permeating material 10, the cover portion 31 becomes transparent, and the color portion 32 becomes visible through the transparent cover portion 31. In this way the determination unit 30 is configured so that its visual appearance changes due to contact with the permeating material 10.

Note that instead of providing the cover portion 31 and the color portion 32 in the determination unit 30, the permeating material 10 may be mixed with a coloring material such as a pigment or a dye. In this case, the visual appearance of the determination unit 30 changes as the permeating material 10 permeates and the determination unit 30 is dyed.

The cover material 220 is provided so as to cover one surface side of the base material 210. The cover material 220 is attached to one surface of the permeation body 20. The cover material 220 is provided so as to cover at least the permeating material 10, the permeation body 20, and the determination unit 30. The cover material 220 is configured so that at least the determination unit 30 can be visually recognized from the outside. The cover material 220 is made of, for example, a transparent film. The cover material 220 is made of a resin film such as PET.

Structure of Permeation Body

As shown in FIGS. 23 and 24, the permeation body 20 includes a first portion 21 provided with the permeating material 10, a second portion 22 provided with the determination unit 30, and a third portion 23 that connects the first portion 21 and a second portion 22. The first portion 21 is arranged on the first end side of the permeation body 20. The second portion 22 is arranged on the second end side of the permeation body 20.

In the example of FIG. 23 and FIG. 24, a plurality of determination units 30 are provided so that the permeating materials 10 arrive at different thermal accumulation amounts.

Specifically, the thermal history detection label 100 is provided with a plurality of determination units, a first determination unit 30a and a second determination unit 30b. The thermal history detection label 100 is configured so as to change state of the first determination unit 30a when exposed to the first reference temperature for a certain accumulation time, and change the state of the determination unit 30b when exposed to the second reference temperature for the certain accumulation time. The second reference temperature is higher than the first reference temperature.

The plurality of determination units of the first determination unit 30a and the second determination unit 30b are arranged at positions at which the permeating material 10 moving in the permeation body 20 sequentially passes. In the examples of FIGS. 23 and 24, the permeating material 10 reaches the second determination unit 30b after passing through the first determination unit 30a.

According to this structure, different thermal histories can be discriminated just by providing a plurality of determination units 30a and 30b on the permeation path of the single permeating material 10. Therefore, since it is not necessary to provide a plurality of permeation bodies 20, the thermal history detection label 100 can be downsized.

The permeation body 20 shown in FIG. 23 has a shape meandering from the first end to the second end. The permeation body 20 has a single permeation path from the first end to the second end. In plan view, the first portion 21, the constricting portion 40a, the third portion 23, the constricting portion 40b, the first second portion 22a, the constricting portion 40c, and the second second portion 22b are lined up in this order in plan view. A first determination unit 30a is provided in the first second portion 22a. A second determination unit 30b is provided in the second second portion 22b.

The first determination unit 30a and the second determination unit 30b become differently distinguishable from each other in visual appearance after the state change when they come into contact with the permeating material 10. In the example of FIG. 23 and FIG. 24, the color of the color section 32 (see FIG. 22) forming the first determination unit 30a and the color of the color section 32 forming the second determination unit 30b are different from each other. For example, the color portion 32 of the first determination unit 30a is green and the color portion 32 of the second determination unit 30b is red. The first determination unit 30a indicates that it has been exposed to a temperature state assumed to be a normal state for a predetermined time or longer by changing its appearance to green. The second determination unit 30b indicates that it has been exposed to a high temperature state exceeding the normal state for a predetermined time or longer by changing its appearance to red.

The color portion 32 of the third portion 23 has the same color as the cover portion 31 before being made transparent. In this way, when the permeating material 10 reaches the third portion 23 and the cover portion 31 is made transparent, the color portion 32 having the same color as that before being made transparent is observed, and thus it is not recognized that the state has changed. For example, the cover portion 31 before being transparent is white, and the color portion 32 of the third portion 23 is white.

Note that in the second structural example, the third portion 23 includes the constricting portions 40a to 40c which have a reduced cross-sectional area through which the permeating material 10 passes. The permeation body 20 includes a plurality of constricting portions 40a to 40c. The third portion 23 has a passage portion 45 having a larger cross-sectional area than the constricting portions 40a to 40c disposed between the plurality of constricting portions 40a to 40c, and the respective constricting portions are located at positions diagonal to the upstream end and the downstream end of the passage portion 45.

The third portion 23 and the two second portions 22a and 22b have a rectangular shape extending in the lateral direction of the permeation body 20. In the example of FIG. 23, the third portion 23 and the two second portions 22a and 22b have substantially the same shape. That is, the first second portion 22a also functions as the third portion 23 connected to the second second portion 22b, and the same action as the passage portion 45 is obtained in the first second portion 22a.

The constricting portion 40a and the constricting portion 40b are arranged at diagonal positions of the passage portion 45 that configures the third portion 23. The constricting portion 40b and the constricting portion 40c are arranged at diagonal positions of the first second portion 22a.

In the example of FIG. 24, the permeation body 20 is composed of one first portion 21 and two second portions 22a and 22b. In a plan view, the first portion 21, the constricting portion 40a, the first second portion 22a, the constricting portion 40b, and the second second portion 22b are arranged in this order from the first end side.

The first second portion 22a is also configured as the third portion 23 which connects the first portion 21 and the second second portion 22b. The first second portion 22a has a passage portion 45 having a larger cross-sectional area than the constricting portions 40a and 40b disposed between the constricting portions 40a and 40b, and the constricting portions 40a and 40b are disposed at positions diagonal to the passage portion 45 configuring the third portion 23. Other structures of the permeation body 20 of FIG. 24 are similar to those of FIG. 23.

Application Example of Thermal History Detection Label

The thermal history detection label 100 shown in FIGS. 22 to 24 is applied to the maintenance of equipment or devices for evaluating the degree of deterioration due to heat in the equipment or devices used for a long period of time.

An example of such a device or equipment is a transformer installed in a factory, for example. The transformer may be, for example, a molded transformer 600 shown in FIG. 25, although an oil-immersed transformer other than the molded transformer 600 also may be used.

The molded transformer 600 has a molded coil 601 having a structure in which a transformer core including an iron core, a winding wire, an insulating paper, and the like are molded with an insulating resin material. In the molded transformer 600, three molded coils 601 corresponding to three-phase power are arranged in an upright state. When the molded transformer 600 is exposed to heat, the iron core, the winding, the insulating paper, and the insulating resin are thermally deteriorated. Therefore, the degree of deterioration of the mold transformer 600 due to heat can be evaluated by detecting the thermal history of the molded transformer 600 for a certain period of time using the thermal history detection label 100.

Figure 25:
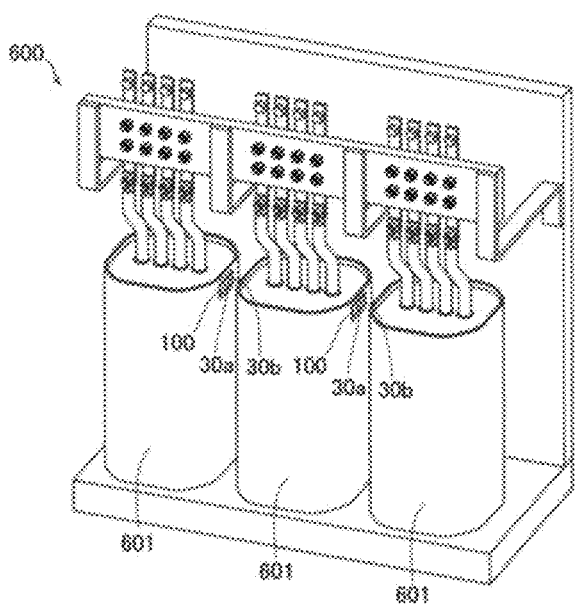
FIG. 25 is a diagram showing a mold transformer that is a second application example of the thermal history detection label.
Figure 26:
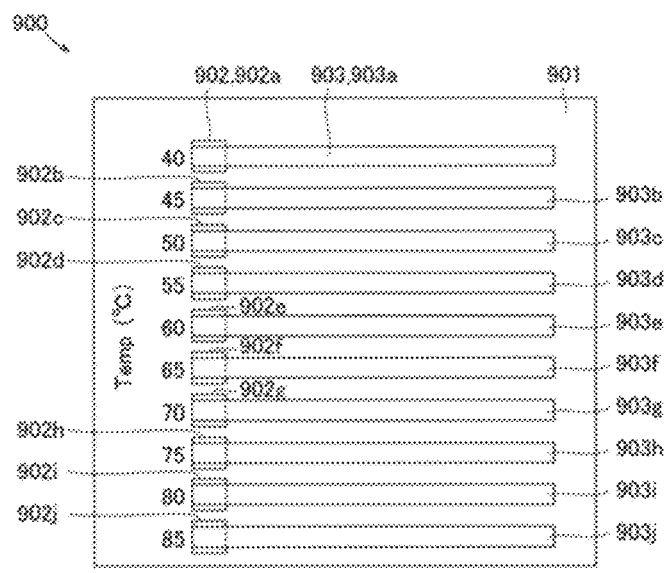
FIG. 26 is a diagram describing a conventional technique.

As shown in FIG. 25, the thermal history detection label 100 is provided, for example, in a portion of the molded coil 601 of the molded transformer 600, which is particularly likely to reach a high temperature. The thermal history detection label 100 is attached to the outer peripheral surface of the upper part of the center molded coil 601 among the three molded coils 601, for example. The thermal history detection label 100 is attached to, for example, a portion of the outer peripheral surface that faces the outer peripheral surface of another adjacent molded coil 601 (that is, the position of the gap between two adjacent molded coils 601). The thermal history detection label 100 may be provided on each of the three molded coils 601. When applied to an oil-immersed transformer, the thermal history detection label 100 is preferably provided on the fin portion of the housing that encases the core.

The thermal history detection label 100 is designed so that the state of the first determination unit 30a changes when continuously exposed to a first temperature for a predetermined accumulation time as a first thermal history pattern. The thermal history detection label 100 is designed so that the state of the second determination unit 30b changes when continuously exposed to a second temperature for a predetermined accumulation time as a second heat history pattern. The second temperature is higher than the first temperature. The first temperature is a temperature assumed in a normal use state, and is a temperature condition under which standard deterioration progresses. The second temperature is a temperature that exceeds normal use conditions, and is a temperature condition under which deterioration progresses beyond standard conditions.

Next, a specific example of the second structural example of the thermal history detection label 100 shown in FIGS. 22 to 24 will be described. In this example, the structure shown in FIG. 23 of FIGS. 23 and 24 is adopted.

Example 3

In the third example, the thermal history detection label 100 having the structure shown in FIG. 23 is designed so that the accumulation time of thermal history is one year. The reference temperatures of the thermal history pattern are set at 60 [° C.] and 70 [° C.]. That is, the thermal history detection label 100 is designed to change the state of the first determination unit 30a when the accumulation time of exposure to a temperature of 60[° C.] reaches one year as the first thermal history pattern. The thermal history detection label 100 is designed so that, as the second thermal history pattern, the state of the second determination unit 30b changes when the accumulation time of exposure to a temperature of 70[° C.] reaches one year.

As shown in FIG. 6A, the permeating material 10 includes a first permeating material 11 and a second permeating material 12 in which the DSC curves 50 do not overlap each other. The first melting point of the first permeating material 11 is 60 [° C.], and the second melting point of the second permeating material 12 is 70 [° C.]. Since the DSC curves 50 do not overlap with each other, it is possible to form a gradual difference in the temperature-dependent flow characteristics of the permeating material 10 as shown by the characteristic curve 55a in FIG. 5. That is, there is a clear difference in the permeation rate of the permeating material 10 between 60[° C.] and 70[° C.], and it is possible to provide a clear difference between the thermal accumulation amount for changing the state of the first determination unit 30a and the thermal accumulation amount for changing the state of the second determination unit 30b.

In the third example, the constricting portions 40a to 40c have a width of 0.4 mm and a length of 0.8 mm. The third portion 23, the second portion 22a, and the second portion 22b have a width of 4 mm and a length of 20 mm. The permeating material 10 has a first permeating material 11 of 2 mg and a second permeating material 12 of 2 mg, and the weight ratio is 1:1. The volume of the permeating material 10 is 30 mm 3.

At the first reference temperature (60[° C.]), the first permeating material 11 is melted and absorbed by the permeation body 20. The permeating material 10 reaches the first determination unit 30a after one year and changes the state of the first determination unit 30a. At the first reference temperature (60[° C.]), the second permeating material 12 does not melt. Therefore, since the amount of the permeating material 10 that is melted is small, the permeating material 10 does not reach the second determination unit 30b.

At the second reference temperature (70[° C.]), not only the first permeating material 11 but also the second permeating material 12 is melted and absorbed by the permeation body 20. Therefore, the amount of the permeating material 10 absorbed by the permeation body 20 increases, and the permeating material can reach the second determination unit 30b beyond the first determination unit 30a. As a result, the permeating material 10 reaches the second determination unit 30b after one year, and changes the state of the second determination unit 30b.

Note that in the third example, the permeating material 10 is configured as the first permeating material 11 and the second permeating material 12 by a combination of saturated hydrocarbons having discontinuous carbon numbers. In this way the DSC curves 50 can be easily separated. As a result, it is possible to gradually change the accumulation time for changing the state of the determination unit 30 for each reference temperature.

As shown in FIG. 25, the user performs a regular inspection of the molded transformer 600. For example, in the case of the third example, the thermal history detection label 100 is confirmed every year and replaced with a new thermal history detection label 100. The user confirms the thermal history detection label 100 and confirms the states of the first determination unit 30a and the second determination unit 30b. When only the state of the first determination unit 30a has changed, it can be evaluated that the progress of deterioration of the molded transformer 600 is standard. When the states of both the first determination unit 30a and the second determination unit 30b are changing, it can be evaluated that the deterioration is progressing beyond the standard. When the states of neither the first determination unit 30a nor the second determination unit 30b have changed, it can be evaluated that the deterioration progress is below the standard.

Note that that the embodiments disclosed this time are exemplifications in all points and not restrictive. The scope of the present invention is shown not by the above description of the embodiments but by the scope of claims, and further includes meanings equivalent to the scope of claims and all modifications therein.

For example, in the above-described embodiments, an example of detecting the thermal history of the reagent kit 500 and the molded transformer 600 is shown as an application example of the thermal history detection label 100, but the present invention is not limited to this. The thermal history detection label of the present invention may be applied to objects such as medicines and other chemicals, lighting equipment such as a fluorescent lamp, food products such as fresh food and cooked food, or a package or the like in which heat-induced quality deterioration occurs.

What is claimed is:

1. A thermal history detection label for detecting a thermal history by a molten permeating material permeating a permeation body, the thermal history detection label comprising:
   a permeating material integrally including a first permeating material having a first melting point and a second permeating material having a second melting point higher than the first melting point; and
   a permeation body into which the permeating material permeates, wherein the permeation body includes a constricting portion through which the permeating material passes, wherein the constricting portion includes a portion of the permeation body having a cross-sectional area that is smaller than other portions of the permeation body.

2. The thermal history detection label according to claim 1, further comprising
   a determination unit that is capable of reaching the permeating material by permeation within the permeation body and is capable of making a determination by contact with the reached permeating material.

3. The thermal history detection label according to claim 2, wherein
   the first permeating material includes a first oily component which has a first melting point; and
   the second permeating material includes a second oily component having a second melting point.

4. The thermal history detection label according to claim 2, wherein
   the permeation body is a sheet of paper; and
   the permeating material is provided at a position separated from the determination unit along a surface direction of the permeation body.

5. The thermal history detection label according to claim 2, wherein
   the permeation body includes a first part provided with the permeating material, a second part provided with the determination unit, and a third part connecting the first part and the second part; and
   the third part includes the constricting portion.

6. The thermal history detection label according to claim 5, wherein
   the permeation body includes a plurality of constricting portions.

7. The thermal history detection label according to claim 6, wherein
   the third part has a passage portion having a larger cross-sectional area than the constricting portion, between the plurality of constricting portions; and
   the constricting portions are provided at positions diagonal to an upstream end and a downstream end of the passage portion.

8. The thermal history detection label according to claim 1, wherein
   the permeating material is a mixture of the first permeating material and the second permeating material.

9. The thermal history detection label according to claim 1, wherein
   the permeating material has a laminate structure in which the first permeating material and the second permeating material are laminated.

10. The thermal history detection label according to claim 9, wherein
    the first permeating material is in contact with the permeation body and the second permeating material is laminated on the first permeating material.

11. The thermal history detection label according to claim 1, wherein
    the first permeating material and the second permeating material contain a saturated hydrocarbon.

12. The thermal history detection label according to claim 2, wherein
    the permeating material is configured such that a first change curve of an arrival time at the determination unit at each temperature from the first melting point to the second melting point becomes shaped along a second change curve that is an allowable time of a monitoring target at each temperature.

13. The heat history detection label according to claim 2, wherein
    the determination unit includes a plurality of determination units so that the permeating material reaches each of the plurality of determination units at a different thermal accumulation amount.

14. The thermal history detection label according to claim 13, wherein
    the plurality of determination portions are arranged at positions at which the permeating material moving in the permeation body sequentially passes.

15. The heat history detection label according to claim 2, wherein the determination unit is configured so that a visual appearance thereof changes by contact with the permeating material.

16. The thermal history detection label according to claim 1, wherein
the permeating material integrally includes two or more kinds of waxes having a melting point of 18° C. or higher and 40° C. or lower.

17. A reagent kit comprising:
a thermal history detection label according to claim 1;
a container for containing a reagent and used for measuring a sample by a sample measuring device; and
wherein the thermal history detection label is attached to the container.

18. The thermal history detection label according to claim 1, wherein the constricting portion includes a portion of the permeation body having a thickness that is smaller than other portions of the permeation body, wherein the portion is formed from a notch in the permeation body.

19. The thermal history detection label according to claim 1, wherein the constricting portion is defined by an impermeable region through which the permeating material does not permeate.

20. The thermal history detection label according to claim 1, wherein the determination unit makes a detectable change in an optical state, an electrical state, or a magnetic state, due to contact with the permeating material.

* * * * *